(12) United States Patent
Kunst et al.

(10) Patent No.: US 7,214,401 B2
(45) Date of Patent: *May 8, 2007

(54) METHOD OF MANUFACTURING AN AERATED CARBOHYDRATE CONTAINING FOOD PRODUCT

(75) Inventors: Anthonie Kunst, Huizen (NL); Wilhelmus Reinerus Blom, Soest (NL); Johannes Wilhelmus Harmanus Elizabeth Diederen, Rosmalen (NL); Rob Dekker, Huizen (NL)

(73) Assignee: Quest International B.V., GP Naarden (NL)

( * ) Notice: Subject to any disclaimer, the term of this patent is extended or adjusted under 35 U.S.C. 154(b) by 251 days.

This patent is subject to a terminal disclaimer.

(21) Appl. No.: 10/309,349

(22) Filed: Dec. 4, 2002

(65) Prior Publication Data

US 2003/0175407 A1    Sep. 18, 2003

(30) Foreign Application Priority Data

Dec. 4, 2001    (EP)    ................................. 01204690

(51) Int. Cl.
*A23G 3/00*    (2006.01)
*A23L 1/09*    (2006.01)

(52) U.S. Cl. ..................... 426/564; 426/656; 426/658

(58) Field of Classification Search ........ 426/564–572, 426/656, 658
See application file for complete search history.

(56) References Cited

U.S. PATENT DOCUMENTS 2,522,050 A * 9/1950 Lenderink ................... 426/572
3,814,816 A * 6/1974 Gunther ....................... 426/46
4,668,772 A   5/1987 Lee
5,520,935 A * 5/1996 Eriksen et al. ............... 426/46
5,741,705 A   4/1998 Blom et al.

FOREIGN PATENT DOCUMENTS

| | | |
|---|---|---|
| EP | 0 295 865 A2 | 12/1988 |
| EP | 0 295 865 A3 | 12/1988 |
| EP | 0 976 331 A2 | 2/2000 |
| EP | 0 976 331 A3 | 2/2000 |
| EP | 1 112 693 A1 | 7/2001 |
| GB | 670 449 A | 4/1952 |
| GB | 705489 A | 3/1954 |
| WO | WO 96/26266 | 8/1996 |
| WO | WO 9626266 A1 * | 8/1996 |
| WO | WO 97/07772 | 3/1997 |
| WO | WO 02/071863 A1 | 9/2002 |

* cited by examiner

*Primary Examiner*—Arthur L. Corbin
(74) *Attorney, Agent, or Firm*—Fitch, Even, Tabin & Flannery

(57) ABSTRACT

This invention provides a method to aerate a carbohydrate containing food product. The method is characterized by the use of a vegetable protein that is hydrolyzed under alkali conditions as whipping agent. More in particular the invention is related to a method for aerating carbohydrate containing food products by using a vegetable protein hydrolysate as whipping agent characterized in that the whipping agent is obtained by converting the vegetable protein by hydrolysis in an aqueous solution with a pH of at least 10 to a peptide product having an average chain length in the range of 5–20 amino acids and a free amino acid level less than 15 wt. % of the total protein derived material.

18 Claims, No Drawings

METHOD OF MANUFACTURING AN AERATED CARBOHYDRATE CONTAINING FOOD PRODUCT

FIELD OF THE INVENTION

The present invention relates to a method to aerate a carbohydrate containing food product, characterised by the use of alkaline hydrolysed vegetable protein as a whipping agent.

BACKGROUND OF THE INVENTION

Proteins and protein hydrolysates are frequently used as whipping agent in sugar confectionery products. Protein hydrolysates are preferably used in case whipping power is required while proteins are more preferred when a contribution to the stability is required. Aeration of carbohydrate containing products can be carried out using a number of methods. Methods that are frequently applied in sugar confectionery are:
1) the open batch system,
2) the pressure batch system,
3) the one step continuous system,
4) the two step continuous system.

Protein hydrolysates in general perform well as whipping agent in all four systems when mixtures containing more than 60% (w/w) carbohydrate are aerated. Except for the pressure batch system the whipping performance of hydrolysed proteins in this mixtures is always better than that of egg white proteins.

In the batch pressure system sugar syrup with a temperature in the range of 105–145° C. is added to a premix with the protein or the protein hydrolysate after which the mixture is aerated at elevated pressure (in general 2–4 bar). The aerated mass is collected carefully via an expansion pipe to allow a gradual release of the pressure. Due to the high aeration temperature and the stability requirements during expansion egg white proteins are found to out perform the protein hydrolysates that are currently available on the market.

There are many reports in the literature dealing with the foaming properties of protein hydrolysates. The more recent ones deal with the enzymatic hydrolysis of protein while the older ones (period 1945–1955) deal with the alkaline hydrolysis of proteins. Alkaline milk protein hydrolysates were used in fire extinguisher foams and as egg substitutes in aerated food products (Kumatat and Beeby, Dairy Industries, September 1954).

In U.S. Pat. No. 2,522,050 a process of manufacturing foaming agent is disclosed according to which a protein is subjected to an alkaline hydrolysis in an aqueous solution containing calcium hydroxide and/or magnesium hydroxide at a pH of at least 10 and at a temperature substantially below 100° C. for a period of at least two days, resulting in a product having satisfactory foaming properties. The obtained product is a mixture of protein and polypeptide containing 5–40% polypeptides. As apparent from the description and the examples of U.S. Pat. No. 2,522,050 it is noticed that the term "substantially below 100° C. " should be interpreted as from room temperature to about 40° C. (see column 2, lines 24–25 and the Examples of U.S. Pat. No. 2,522,050).

The above indicated view with respect to an upper hydrolysing temperature of about 40° C. is supported by the contents of GB 670,413. In said GB 670,413 a process for the preparation of foamable products is disclosed according to which proteins are subjected at ordinary temperature, i.e. about 20–25° C. for a period of at least one day to hydrolysis by an aqueous liquid containing calcium hydroxide. For the sake of completeness it is referred to a passage on page 2, lines 55–60, clearly indicating that the hydrolysation of proteins with alkaline earth hydroxides at temperatures to 100° C. and higher will result in protein solutions not processing satisfactory foaming properties.

It is well known to a man skilled in the art that the poor taste of the alkaline hydrolysates is a serious drawback. In general they are chalky and bitter, and in addition they can have a sulphury and rubbery taste. Increasing the temperature during hydrolysis, which may reduce the reaction time also increases the formation of these unwanted flavour components. As a consequence the reaction temperature is a dictating compromise between the flavour of the product and the economics of producing it and does result in an upper hydrolysing temperature of about 40° C.

DETAILED DESCRIPTION OF THE INVENTION AND THE PREFERRED EMBODIMENTS

Surprisingly it has been found that alkaline hydrolysates of vegetable proteins such as pea protein, rice or potato protein perform very good as whipping agent and even significantly better than egg white proteins in the pressure batch system.

Further it was found that the alkaline protein hydrolysates prepared by the process according to the invention do have a taste that is at least comparable with that of the currently existing products. The alkaline hydrolysates of vegetable proteins such as pea, rice or potato protein are therefore very well suited to replace egg white proteins as whipping agent in sugar confectionery products especially those that are produced using the pressure batch method.

Where the products of the prior art are mixtures of protein and polypeptide containing 5–40% polypeptides (U.S. Pat. No. 2,522,050) the product of the present invention does not contain significant amounts of the intact protein raw material as can be shown with common gel electrophoresis techniques well known to a person skilled in the art.

Therefore, the present invention provides a method to aerate a carbohydrate containing food product, characterised in that a carbohydrate containing food product is aerated by the use of a vegetable protein hydrolysate as whipping agent that is obtained by subjecting this vegetable protein to a hydrolysis in an aqueous solution with a pH of at least 10 and that is further characterised by an average chain length in the range of 5–20amino acids and with a free amino acid level less than 15 wt. % of the total protein derived material.

Preferably the alkali hydrolysed vegetable protein according to the invention has an average peptide chain length in the range of 6 to 18 amino acids and most preferably 7 to 15 amino acids. Further, the whipping agent according to the invention has preferably a free amino acid level of at most 10 wt. %, most preferably at most 5 wt. % of the total protein derived material. Preferably the vegetable protein is pea protein.

The hydrolysis can be carried out at a temperature in the range from 20–100° C., preferably at a temperature in the range of 40–90° C. and more preferable at a temperature in the range of 55–75° C.

The hydrolysing agent used in the process according to the invention is selected from the group consisting of alkaline and alkaline earth oxides, hydroxides and carbonates. Preferably the hydrolysing agent is composed of a combination of at least one alkaline hydroxide, e.g. NaOH, KOH and at least one alkaline earth hydroxide, e.g. Ca(OH)$_2$ or Mg(OH)$_2$.

After hydrolysis the pH of the mixture can be reduced by adding an amount of an acid that is allowed to be used in food products. Non limiting examples of such acids are lactic acid, citric acid, malic acid or phosphoric acid.

For the sake of clarity, a whipping agent is defined as any substance with interfacial properties that due to its adsorption dynamics and its presence at the gas-liquid interface will facilitate the uptake and stabilisation of gas cells when the mixture that contains the whipping agent is aerated. Non-limiting examples of products obtained from such processes are sugar confectionery, products, sorbets, ice creams, milk shakes, nougats, hard-boiled sweets, marshmallows and frappes.

Preferably the carbohydrate level in the mixture that is aerated is higher than 10 wt. % and more preferably higher than 20 wt. % and for instance higher than 50 wt. %. In products such as for instance nougat, the aerated sugar mass contains about 90 wt % carbohydrates (w/w). The carbohydrates can be selected from the group mono-saccharides (such as glucose, fructose), di-saccharides such as sucrose, lactose, maltose and oligo-saccharides. The carbohydrates can also be selected from the group that is known to those skilled in the art as glucose syrups, maltodextrins or invert sugars. Glucose syrups or maltodextrins are generally obtained by hydrolysis of starch. The obtained products have widely differing constitutions and properties, depending on the extent to which the starch hydrolysis is allowed to proceed. Invert sugars are obtained after hydrolysis of sucrose.

The aeration of the carbohydrate containing food product is preferably carried out in a closed container at a higher than atmospheric pressure, up to 5 ato.

In order to modify the texture of the aerated product a hydrocolloid can be added prior to aeration to the carbohydrate containing food product. Suitable examples of hydrocolloids are guar gum, locust bean gum, xanthan, carageenan, pectin, starch, agar, gum arabic, gellan and alginate.

The free amino acid level in the hydrolysate can be analysed using standard methods well known to those skilled in the art. The average peptide chain length can be calculated as described below.

Calculation of the Average Peptide Chain Length.

Definitions
TN : Total Nitrogen.
AN : Alpha amino Nitrogen.
EN : Epsilon amino Nitrogen.
AEN : The sum of alpha and epsilon nitrogen.
PN : Nitrogen in (potential) peptide bonds (PN thus includes all AN).
FAA : free amino acid level.
F : average amount of Nitrogen per amino acid residue in a protein.
PCL : average peptide chain length.

Determination of Parameters
AEN can be determined via methods such as the TNBS (trinitrobenzene sulphonic acid) method or via formol titration.
TN can be determined via the well known Kjeldahl method.
EN is only present in the side chain of lysine so it is equal to the amount of lysine in the product.
FAA is determined using an amino acid analyser.
AN can be calculated from the AEN (as determined via TNBS or formol titration) and the amount of lys (=EN) in the protein hydrolysate.

$$AN = AEN - EN \quad (1)$$

PN can be approximated from TN using the average amount of nitrogen (F) per amino acid.

$$PN = TN/F \quad (2)$$

Most amino acids only have one alpha nitrogen atom but trp, lys, asn and gln have 1 extra nitrogen in the side chain, his has 2 extra nitrogen and arg has 3 extra nitrogen in the aide chain. In Table 1 the average amount of Nitrogen per amino acid (F) for pea, potato and rice protein is given as well as the average mol. weight of the amino acids in the protein, the conversion factor ($N_{conf}$) from nitrogen to protein and the % lysine.

TABLE 1

Data an pea, potato and rice protein.

| | $N_{conf}$ | $MW_{avg}$ | F, mol/mol | % lys |
|---|---|---|---|---|
| pea protein | 6.30 | 131.7 | 1.29 | 7.61 |
| potato protein | 6.50 | 132.2 | 1.25 | 7.77 |
| rice protein | 5.90 | 129.9 | 1.35 | 4.97 |

Calculation of the Average Peptide Chain Length
The average peptide chain length can be calculated from AN and PN:

$$PCL = PN/AN \quad (3)$$

Combining eq. 3 with eq. 2 gives; $PCL = TN/(F*AN)$ \quad (4)

Combining eq. 4 with eq. 1 gives: $PCL = TN/(F*(AEN-EN))$ \quad (5)

With eq. 5 the average peptide length in a hydrolysate is calculated in which also the FAA is taken into account. Strictly spoken an amino acid is not a peptide and FAA thus should not be included in the calculation of the average PCL. To calculate the average peptide length of the non FAA fraction, TN and AN of this fraction are required. Rewriting eq. 4 for the peptide fraction gives:

$$PCL_{pep} = TN_{pep}/(F*AN_{pep}) \quad (6)$$

in which:

$$TN_{pep} = TN - TN_{FAA} \quad (7)$$

$$TN_{FAA} = F*FAA \quad (8)$$

$$AN_{pe} = AN - FAA \quad (9)$$

Combining eq. 6 with eq 1, 7, 8 and 9 results in:

$$PCL_{pcp} = \frac{TN/F - FAA}{AEN - EN - FAA} \quad (10)$$

in which TN, AN, AEN, EN and FAA are given in mmol per weight unit.

The following are non-limiting examples of the present invention.

EXAMPLE 1

Production of Pea Protein Hydrolysate

To a 9 wt. % dispersion of pea protein (Pisane HD from Cosucra) 145 gram $Ca(OH)_2$ was added per kilo of protein.

The proteins in this mixture were hydrolysed by subjecting them to temperatures in the range of 40–90° C. for a period of time as indicated in Table 1. After hydrolysis the hydrolysate is concentrated via evaporation and than was dried.

The whipping performance of the obtained product was tested by whipping a solution containing 160 gram icing sugar, 67.5 gram water and 2.5 gram of the hydrolysate in a Hobart mixer type N 50 with the wire wisk. The foam density was determined after 2 min and after 5 min whipping at speed 3.

The performance and taste of the hydrolysates produced as described in this example were compared with the well known commercially available whipping agent Hyfoama DSN (Quest-International). Hyfoama DSN is a casein hydrolysate.

In addition the average peptide chain length was determined.

The results are summarised in Table 1 and show that the performance of the pea protein hydrolysate according to the present invention after 5 minutes of whipping is similar to that of the existing commercially available product. The rate with which air is being taken up is slightly lower. It also can be seen that at temperatures higher than 70° C. the taste of the final product is getting worse.

TABLE 1

Hydrolysis conditions and performance.

| hydrolysis temperature | hydrolysis time | Foam density 2 min. | Foam density 5 min. | Peptide Chain Length (av.) | Taste |
|---|---|---|---|---|---|
| 40° C. | 90 hour | 0.42 | 0.33 | 15.0 | good |
| 50° C. | 66 hour | 0.41 | 0.33 | — | good |
| 60° C. | 48 hour | 0.43 | 0.33 | 11.7 | good |
| 70° C. | 46 hour | 0.43 | 0.33 | — | acceptable |
| 80° C. | 40 hour | 0.40 | 0.31 | 9.8 | poor |
| 90° C. | 34 hour | 0.41 | 0.32 | — | poor |
| Hyfoama DSN (reference) | | 0.36 | 0.32 | 10.2 | acceptable |

EXAMPLE 2

Production of Rice Protein Hydrolysate

To a 10 wt. % dispersion of rice protein (Remy Rice Protein), 95 gram NaOH and 55 gram $Ca(OH)_2$ were added per kilo of protein. The temperature of this mixture is kept at 60° C. for 48 hours to allow hydrolysis of the protein. After hydrolysis the hydrolysate is concentrated via evaporation and dried.

The whipping performance of the obtained product was tested using the procedure as described in Example 1. The results are summarised in Table 2 and show that the performance of the rice protein hydrolysate according to the present invention is similar to that of the existing commercially available product.

TABLE 2

Performance of rice protein hydrolysate.

| | Foam density 2 min. | Foam density 5 min. | Peptide Chain Length (average) |
|---|---|---|---|
| rice protein hydrolysate | 0.33 | 0.32 | 12.5 |
| Hyfoama DSN | 0.36 | 0.32 | 10.2 |

EXAMPLE 3

Production of Potato Protein Hydrolysate

To a 10 wt. % dispersion of potato protein (Poquette), 100 gram NaOH and 60 gram $Ca(OH)_2$ were added per kilo of protein. The temperature of this mixture is kept at 60° C. for 48 hours to allow hydrolysis of the protein. After hydrolysis the hydrolysate is concentrated via evaporation and dried.

The whipping performance of the obtained product was tested using the procedure as described in Example 1. The results are summarised in Table 3 and show that the performance of the potato protein hydrolysate according to the present invention is comparable with that of an existing commercially available product.

TABLE 3

Performance of potato protein hydrolysate.

| | Foam density 2 min. | Foam density 5 min. | Peptide Chain Length (average) |
|---|---|---|---|
| potato protein hydrolysate | 0.38 | 0.33 | 8.6 |
| Hyfoama DSN | 0.36 | 0.32 | 10.2 |

EXAMPLE 4

Application of Vegetable Alkali Protein Hydrolysate in the Batch Pressure System Batch high pressure whipping is a frequently used technique to produce an aerated confectionery sugar mass.

The performance of whipping agents was tested using the following procedure. Protein or protein hydrolysate is dissolved in a sugar solution of about 60% in the bowl of a pressure beater (protein or protein hydrolysate: 20 gram, icing sugar: 100 gram, water: 80 gram). Under gentle mixing boiling sugar syrup is added. The sugar syrup is obtained by boiling a mixture containing 1750 gram sugar, 2000 gram glucose syrup (35 DE) and 600 gram water until a temperature of 124° C. is reached.

Thereafter the mixture is whipped under a pressure of 3 bar at a fixed speed (speed 2) for 3.5 min.

The whipped sugar mass is collected via and expansion pipe in which the aerated mass is expanded. The density of the obtained aerated sugar mass is determined directly after it has been collected and after it has cooled down to ambient temperature. The results are summarised in Table 4 and show that the protein hydrolysates according to the present invention perform very good in the batch pressure beater.

TABLE 4

Application of vegetable alkaliprotein hydrolysates in the batch pressure beater.

|  | density (hot) | density (ambient) |
|---|---|---|
| Egg White Protein | 0.43 gr/ml | 0.57 gr/ml |
| HyFoama DSN | 0.48 gr/ml | 0.59 gr/ml |
| rice protein hydrolysate | 0.40 gr/ml | 0.51 gr/ml |
| potato protein hydrolysate | 0.42 g/ml | 0.56 g/ml |
| pea protein hydrolysate | 0.36 gr/ml | 0.48 gr/ml |

The invention claimed is:

1. A method for aerating a carbohydrate containing food product by using a vegetable protein hydrolysate as a whipping agent including obtaining the whipping agent by converting vegetable protein by hydrolysis with a hydrolysing agent in an aqueous solution having a pH of at least 10, to a peptide product having an average chain length in the range of 5–15 amino acids and a free amino acid level of less than 15 wt. % of the total protein derived material, wherein the hydrolysis is carried out at a temperature in the range of 40–90° C.

2. A method according to claim 1, wherein the hydrolysis is carried out at a temperature in the range of 40–70° C.

3. A method according to claim 1 wherein the hydrolysis is carried out at a temperature in the range of 55–75° C.

4. A method according to claim 1, wherein the hydrolysing agent is selected from the group consisting of alkaline and alkaline earth oxides, hydroxides and carbonates.

5. A method according to claim 1, wherein the hydrolysing agent is composed of a combination of at least one alkaline and at least one alkaline earth hydroxide.

6. A method according to claim 5, wherein the hydrolysing agent is composed of a combination of at least NaOH or KOH and at least $Ca(OH)_2$ or $Mg(OH)_2$.

7. A method according to claim 1, wherein the average chain length of the peptides is in the range of 7–15 amino acids.

8. A method according to claim 1, wherein the free amino acid level is less than 10 wt. % of the total protein derived material.

9. A method according to claim 8, wherein the free amino acid level is less than 5 wt. % of the total protein derived material.

10. A method according to claim 1, wherein the vegetable protein is a pea protein.

11. A method according to claim 1, wherein the vegetable protein is a rice protein.

12. A method according to claim 1, wherein the vegetable protein is a potato protein.

13. A method according to claim 1, wherein the carbohydrate is selected from the group consisting of mono-saccharides, di-saccharides, oligosaccharides, glucose syrup, maltodextrin and invert sugar.

14. A method according to claim 1, wherein the carbohydrate level of the product as percentage of the total dry matter weight is at least 10%.

15. A method according to claim 1, wherein the carbohydrate level of the product as percentage of the total dry matter weight is at least 20%.

16. A method according to claim 1, wherein the aeration is carried out in a closed container at a higher than atmospheric pressure up to 5 atm.

17. A method according to claim 1, wherein a hydrocolloid is added to the food product prior to aeration in order to modify the texture of the aerated product.

18. A method according to claim 17, wherein the hydrocolloid is selected from the group consisting of guar gum, locust bean gum, xanthan, carrageenan, pectin, starch, agar, gum arabic, gellan and alginate.

* * * * *